United States Patent
Nelson et al.

(10) Patent No.: US 7,309,516 B2
(45) Date of Patent: Dec. 18, 2007

(54) CELLULOSE GYPSUM BASED SUBSTRATE WITH INCREASED WATER RESISTANCE AND STRENGTH BY SURFACE APPLICATION OF POLYMERIC DIPHENYLMETHANE DIISOCYANATE

(75) Inventors: Christopher R. Nelson, Grayslake, IL (US); Mark B. Scalf, McHenry, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 10/978,572

(22) Filed: Nov. 1, 2004

(65) Prior Publication Data

US 2005/0064203 A1    Mar. 24, 2005

Related U.S. Application Data

(62) Division of application No. 10/251,461, filed on Sep. 20, 2002, now Pat. No. 6,951,586, which is a division of application No. 09/732,608, filed on Dec. 8, 2000, now abandoned.

(51) Int. Cl.
    *B05D 5/00*    (2006.01)
(52) U.S. Cl. .............. 427/421.1; 427/424; 427/427.4; 427/427.7; 427/385.5; 427/393.6; 15/257.06

(58) Field of Classification Search ............. 427/421.1, 427/424, 427.4, 427.7, 385.5, 393.6; 15/257.06
See application file for complete search history.

(56) References Cited

U.S. PATENT DOCUMENTS

| 4,647,496 | A | | 3/1987 | Lehnert et al. |
| 5,115,972 | A | * | 5/1992 | Maier et al. ............... 239/8 |
| 5,397,631 | A | * | 3/1995 | Green et al. .............. 428/219 |
| 6,217,946 | B1 | * | 4/2001 | Bolind et al. ............. 427/429 |
| 6,376,582 | B1 | * | 4/2002 | Iwata et al. ............... 524/14 |
| 6,703,331 | B1 | * | 3/2004 | Bruce et al. .............. 442/386 |

* cited by examiner

*Primary Examiner*—Alain L. Bashore
(74) *Attorney, Agent, or Firm*—Michael M. Geoffrey; David F. Janci; Anthony P. Venturino

(57) ABSTRACT

The disclosed invention consists of an improved gypsum based, cellulosic containing board and method for applying a resin to an untreated board at a spray station where pMDI resin is sprayed onto the front and back side of the board. A resin distribution system is used to supply the spray nozzles with pMDI. Optionally, a second spray station is included, if desired, to add additional pMDI resin over the surface of the board to achieve complete coverage. The improvement is an increased water resistance and flexural strength.

24 Claims, 2 Drawing Sheets

CELLULOSE GYPSUM BASED SUBSTRATE WITH INCREASED WATER RESISTANCE AND STRENGTH BY SURFACE APPLICATION OF POLYMERIC DIPHENYLMETHANE DIISOCYANATE

This application is a divisional application of application Ser. No. 10/251,461 filed on Sep. 20, 2002 now U.S. Pat. No. 6,951,586, which is a divisional application of application Ser. No. 09/732,608 filed on Dec. 8, 2000, now abandoned.

BACKGROUND OF THE INVENTION

The present invention relates generally to the ability to provide a uniform application of polymeric diphenylmethane diisocyanate (pMDI) onto cellulose gypsum panels, boards and other surfaces, to create a substrate with increased strength and water resistance.

Exterior wall cladding is used as a barrier to keep exterior air and moisture out of the wall cavity. If water and moisture penetrate the wall cladding surface damage will result to the cladding board itself. Prior art exterior wall cladding was made out of gypsum sheathing or water-resistant gypsum board. It was found that the application of pMDI to a cellulose/gypsum based board greatly increased the board's strength and water resistance. The disclosed invention applies the pMDI to the cellulose/gypsum based board with an apparatus that provides a uniform coating across the board which results in increased water resistance and flexural strength.

SUMMARY OF THE INVENTION

The disclosed invention consists of an improved cellulose/gypsum based board, and means for conveying a gypsum and cellulosic board or panel to a spray station where pMDI resin is delivered through a series of spray nozzles to the face and back of the gypsum board or panel. A resin distribution system is used to supply the spray nozzles with pMDI. Optionally, to assist in the spreading of the pMDI resin over the surface of the cellulose/gypsum board to achieve complete coverage of the cellulose/gypsum-based substrate, a second spray system can be included. The nozzles of the second spray system may be adjusted to cover areas of the face and back of the board that are not covered by the first spray system. The resulting panel exhibits dramatically improved water resistance and flexural strength. Atmospheric moisture is sufficient to cure the pMDI matrix.

DETAILED DESCRIPTION OF THE PREFERRED EMBODIMENT

Figure 1:
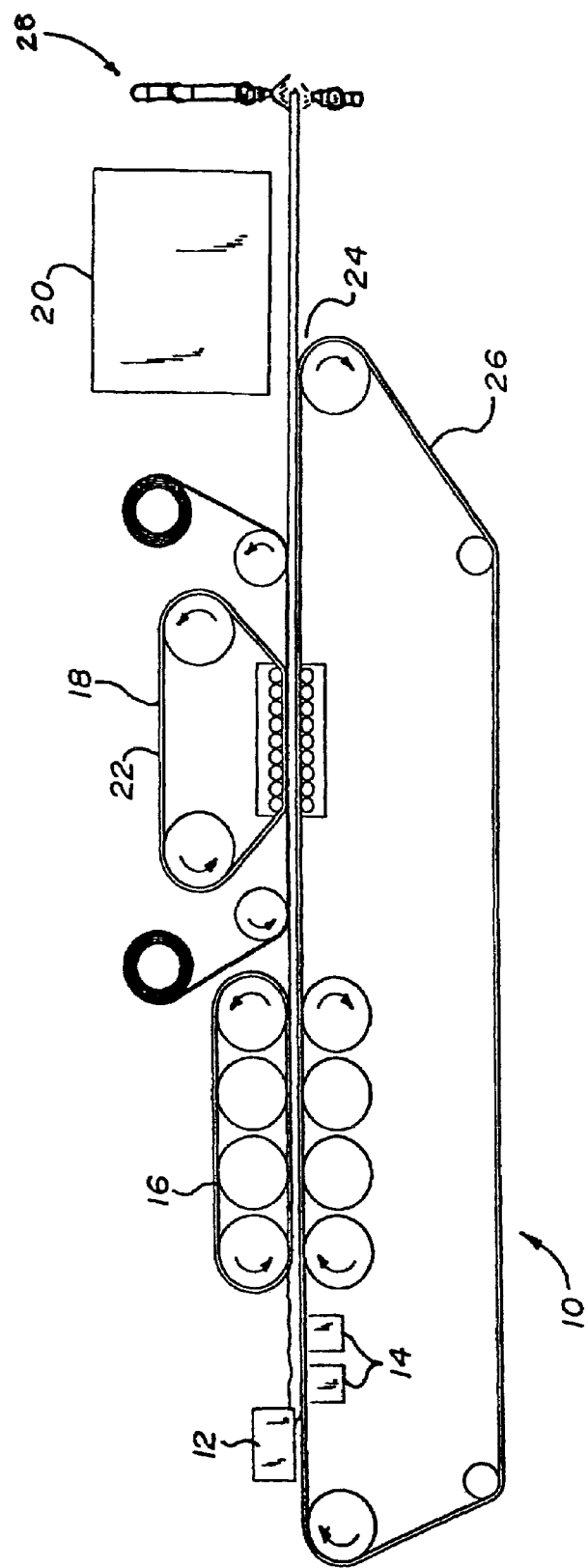
FIG. 1 is a schematic drawing illustrating a production line for forming cellulose/gypsum board having a head box, dewatering vacuums, a dewatering primary press, a secondary press, a drying kiln and a resin distribution system all for processing a rehydratable gypsum fiber slurry upon a conveyor.

The present invention is directed to an improved cellulose/gypsum based board and to a method for applying polymeric diphenylmethane diisocyanate (pMDI) to a cellulose/gypsum based board, and in particular, the use of one or more spray systems to provide a uniform application of pMDI onto the cellulose/gypsum based board. The forming system, generally designated with the numeral 10 and shown in FIG. 1, includes a head box 12, vacuum boxes 14, a wet (primary) press 16, a secondary press 18, and a drying kiln 20. The function of the primary press 16 is 1) to nip a gypsum/cellulose fiber filter cake mat to a desired thickness and 2) to remove 80-90% of remaining water. The function of the secondary press 18 is to compress the board during setting to a calibrated final thickness and to aid in achieving flexural strength in the final product. The secondary press 18 has a continuous belt 22 that also aids in achieving smoothness to the board surface as the rehydrating mat expands against the belt 22. The head box 12 is used to uniformly disperse a calcined slurry having at least about 70% liquid by weight, across the width of the forming table 24, where vacuum boxes 14 are used to dewater the slurry into a mat of generally 28-41% moisture content (wet basis) (40-70% moisture content on a dry basis). The forming table 24 includes side dams to contain the slurry pond and a conveyor or forming wire 26 to move the slurry away from the head box 12 and towards the primary press 16. As the slurry moves along the forming table 24, the vacuum boxes 14 dewater the slurry into a mat, creating a decreasing water content gradient in the slurry going from the head box 12 towards the primary press 16. At some point along this gradient, there is a zone referred to as the wet line, where it is observable that the slurry is changing into the wet mat. Put another way, one can see that the slurry is no longer fluid as the water is removed.

In the preferred embodiment, the slurry pond is further dewatered and formed into a filter cake by the application of additional vacuum boxes 14. With reference to FIG. 1, the conveyor or forming wire 26 carries the filter cake to the primary press 16 which further dewaters the filter cake and nips the material to a desired thickness. During this time, the board begins setting and expands to fill the nip gap. The board exits the primary press 16 and is carried on the conveyor 26 to the secondary press 18. The secondary press 18 shapes the board to a final calibrated thickness. The board expands against the smooth belt 22 of the secondary press 18 which further aids in rendering a smooth surface and increased flex strength.

After exiting the secondary press 18, the board is dried in a kiln 20. A non-aqueous pMDI resin is spray-applied to the face and backside of the cellulose/gypsum board by using a spray system 28 that sprays at a preferable rate from about 9 to about 25 pounds per 1000 square feet of cellulose/gypsum board. The pMDI penetrates efficiently into the board. As the pMDI migrates through the board, a reaction takes place between water that is in the ambient air, plus any remaining/evaporating water in the board, and the pMDI that permeates into the board. The interaction between the pMDI and the water transforms the pMDI into polyurethane, which forms urethane linkages with the cellulosic fibers at and slightly below the surface of the board to seal the faces of the board. The polyurethane does not increase the overall thickness of the board but rather seeps into the board. The resin applied to the board by the spray system 28 thus does not remain suspended to cure as a mere coating on the surface due to the polymeric resin, like pMDI, interacting with the cellulosic fibers. Water from the ambient surroundings is sufficient to start the curing of the pMDI, and, thus the resin is applied to a dried board, which may have a small percentage of evaporating remaining free water that has not yet evaporated. The non-aqueous resin soaks into the board and reacts with the cellulosic fibers in the board. A polyurethane/cellulose matrix is formed. By treating the entire cellulose/gypsum board with pMDI, a polyurethane/cellulose matrix is formed that completely seals the board.

The resultant cellulose/gypsum board treated with the pMDI has an increase in flexural strength of 20-35% over the non-treated board. The typical curing time to allow for complete transportation of the pMDI into the polyurethane cellulose matrix within the board is approximately three days, but may vary depending upon ambient conditions.

The polyurethane/cellulose matrix formed does not increase the overall thickness of the board. The matrix becomes a water resistant layer of the board that is approximately ⅛ inch thick. A cellulose/gypsum board treated with pMDI on one side, allowed to cure, and completely submersed in water resulted in the deterioration of the untreated portion of the board. The treated portion of the board remained intact and was about ⅛ inch thick.

A water absorption test was performed on the surface of both an untreated cellulose/gypsum board and a board treated with pMDI to determine the quantity of water absorbed by the board. During the test, 100 square centimeters of the surface of the board was subjected to 100 milliliters of 70° F. water for two hours. The untreated board absorbed 92-100 grams of water during the two hour test period. The board treated with pMDI absorbed 0.5 grams of water for the 2 hour test period which is well below the acceptable limit for exterior cladding. Boards treated with pMDI were more scuff resistant than untreated boards and were less dusty when handled. These desirable qualities are beneficial because they enhance the marketability of the resultant product.

Figure 2:
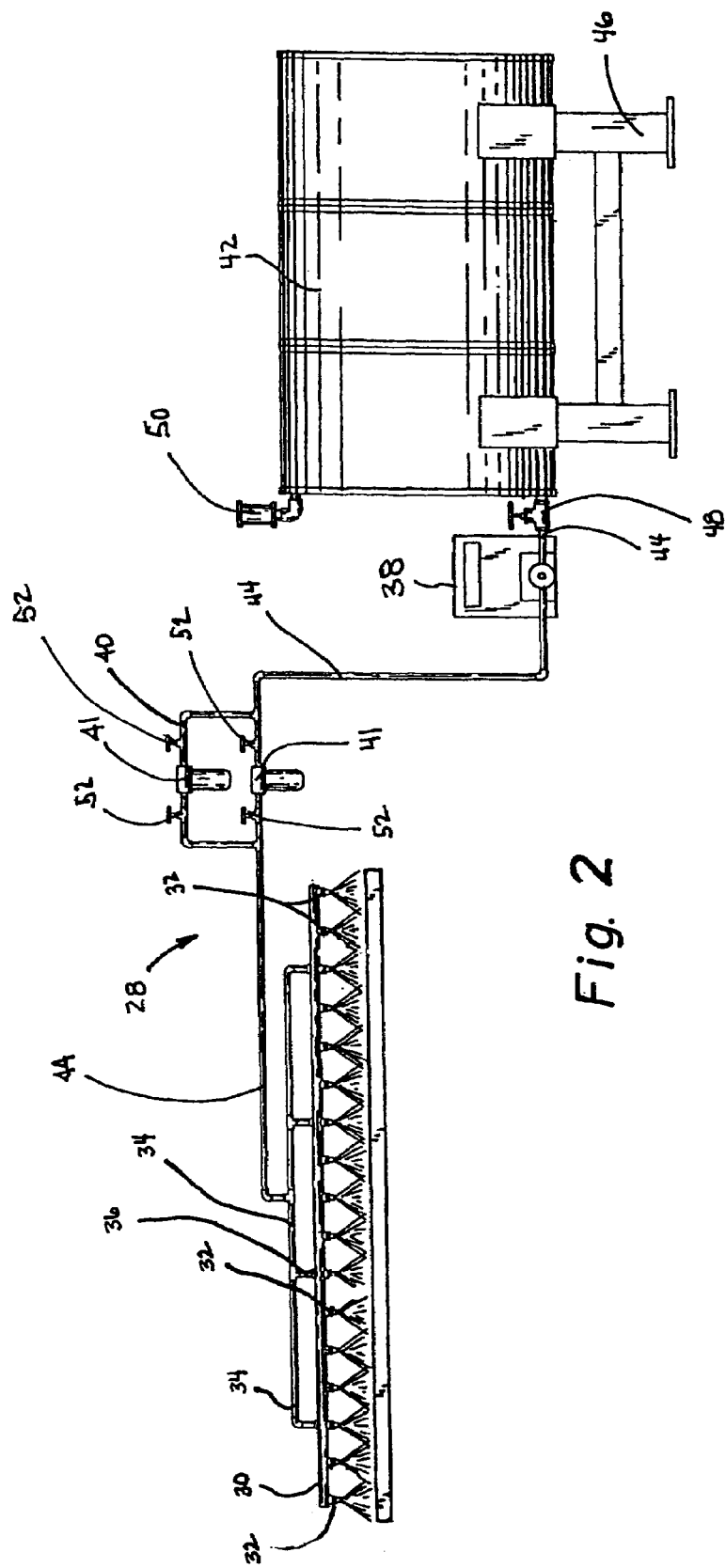
FIG. 2 is a front view of the resin distribution system including a resin drum, a metering pump and the spray system.

The spray system 28, as shown in FIG. 2 includes a horizontal spray bar 30 equipped with equally spaced spray nozzles 32, a manifold 34, feed tubes 36, a filtering system 40, a positive displacement pump 38 and a storage container 42. The spray bar 30 is an elongated tube that spans the width of the board. Typical sheets of cellulose/gypsum board are 48 inches in width. In the preferred arrangement, the spray nozzles 32 are attached to the spray bar 30 in three inch intervals. It has been found that placing the spray nozzles 32 three inches apart provides for enough spray overlap to adequately wet the board with pMDI. The spray nozzles 32 spray in a fan pattern and are positioned 8-10 inches above the board. Placing the nozzles 32 close to the board reduces the amount of overspray that is typically associated with spray systems. The spray nozzles 32 are not air assisted since it is desirable to reduce atomization of the pMDI so overspray can be kept to a minimum. Overspray decreases the pMDI transfer rate onto the board, which increases the amount of pMDI required to coat the cellulose/gypsum board and the amount of overall product required. The spray bar 30 is connected to the manifold 34 that delivers pMDI to different locations on the spray bar 30 by use of feed tubes 36. The feed tubes 36 are vertically oriented and connect the spray bar 30 to the manifold 34. The manifold 36 is supplied with pMDI under pressure from a positive displacement pump 38. The pump 38 is connected to the storage container 42 by use of a supply line 44. The supply line 44 also connects the pump 38 to the filter system 40 and the filter system 40 to the manifold 34. The storage container 42 is typically a storage drum that is positioned upon a drum cart 46. The storage container 42 also includes a valve 48 and a breather 50 to allow for the removal of pMDI. The breather 50 is utilized to allow air to displace the pMDI removed from the storage container 42. The pump 38 is adjusted to the desired flowrate and pumps the pMDI through the filter system 40 and to the manifold 34. The filter system 40 includes two filters 41 connected in parallel to filter out any particles that may clog the nozzles 32. The filter system 40 is equipped with valves 52 to allow the supply line 44 to be closed off to prevent the leakage during the replacement of the filters 41. By utilizing two filters 41 that are large enough handle the flowrate of the pMDI from the pump 38, one filter 41 can be taken off-line for a filter replacement while the other filter 41 remains in service.

The invention is also useful for paper coated gypsum board wherein the paper provides the cellulosic fibers for forming the urethane linkages with the curing pMDI.

Various features of the invention have been particularly shown and described in connection with the illustrated embodiments of the invention. However, it must be understood that these particular arrangements, and their method of manufacture, do not limit but merely illustrate, and that the invention is to be given its fullest interpretation within the terms of the appended claims.

What is claimed is:

1. A method of applying a non-aqueous polymeric resin to a gypsum based board having a surface consisting essentially of gypsum, optional residual water, and cellulosic fibers including the steps of:
   providing said board;
   providing a spray system having nozzles;
   pumping the polymeric resin through said nozzles;
   uniformly applying the polymeric resin onto said board surface by spraying the polymeric resin onto said board surface to transfer the polymeric resin from said nozzles to said board surface; and
   allowing the polymeric resin to cure within said board, wherein the board has an increase in flexural strength of 20-35% over non-treated board.

2. The method in accordance with claim 1, wherein the step of pumping the polymeric resin to said nozzles includes the step of providing a resin distribution system to continuously pump the polymeric resin to said nozzles.

3. The method in accordance with claim 1, wherein the step of uniformly applying the polymeric resin onto said board retains the thickness of the board.

4. The method in accordance with claim 1, wherein the step of providing a spray system having nozzles includes the placement of said nozzles within from about 8 inches to about 10 inches from the board.

5. The method in accordance with claim 1, wherein the step of providing a spray system having nozzles includes nozzles that have a fan spray pattern.

6. The method in accordance with claim 1, wherein the step of providing a spray system having nozzles includes separation of said nozzles by about 3 inches.

7. The method in accordance with claim 1, wherein the polymeric resin cures to form a polyurethane resin.

8. The method in accordance with claim 1, wherein the polymeric resin forms a matrix of a polyurethane resin and said cellulose fibers at and below the surface of the board.

9. The method in accordance with claim 1, wherein the polymeric resin comprises pMDI resin.

10. The method in accordance with claim 1, wherein the board is a cellulose/gypsum board comprising gypsum and cellulosic fibers embedded in the gypsum.

11. A method in accordance with claim 1, wherein the board contains water when the polymer is sprayed on the gypsum based substrate, wherein the water reacts with the polymeric resin to form polyurethane.

12. The method in accordance with claim 1, further comprising allowing the polymeric resin to cure within said board to form a polyurethane/cellulose matrix.

13. The method in accordance with claim 12, wherein the polymeric resin comprises pMDI resin.

14. A method in accordance with claim 1, wherein the step of pumping the polymeric resin to said nozzles includes the step of providing a resin distribution system to continuously pump the polymeric resin to said nozzles.

15. The method in accordance with claim 1, wherein the spray system is a non-atomized spray system.

16. The method in accordance with claim 1, wherein the method produces a water resistant board.

17. The method in accordance with claim 1, wherein the board absorbs at most about 0.5 grams of water per 100 square centimeters according to a test wherein 100 square centimeters of the surface of the board are subjected to 100 milliliters of 70° F. water for two hours.

18. The method in accordance with claim 2, wherein the method produces a water resistant board.

19. A method of applying a non-aqueous polymeric resin to a gypsum based board having a surface consisting essentially of gypsum, optional residual water, and cellulosic fibers including the steps of:
providing said board;
providing a spray system having nozzles;
pumping the polymeric resin through said nozzles;
uniformly applying the polymeric resin onto said board surface by spraying the polymeric resin onto said board surface to transfer the polymeric resin from said nozzles to said board surface; and
allowing the polymeric resin to cure within said board,
wherein the board absorbs at most about 0.5 grams of water per 100 square centimeters according to a test wherein 100 square centimeters of the surface of the board are subjected to 100 milliliters of 70° F. water for two hours.

20. The method in accordance with claim 19, wherein the polymeric resin cures to form a polyurethane resin.

21. The method in accordance with claim 19, wherein the polymeric resin comprises pMDI resin.

22. The method of claim 19, wherein the spray system is a non-atomized spray system.

23. A method of applying a non-aqueous polymeric resin to a gypsum based board having a surface consisting essentially of gypsum, optional residual water, and cellulosic fibers including the steps of:
providing said board;
providing a spray system having nozzles;
pumping the polymeric resin through said nozzles;
uniformly applying the polymeric resin onto said board surface by spraying the polymeric resin onto said board surface to transfer the polymeric resin from said nozzles to said board surface; and
allowing the polymeric resin to cure within said board,
wherein the method produces a water resistant board,
wherein the board absorbs at most about 0.5 grams of water per 100 square centimeters according to a test wherein 100 square centimeters of the surface of the board are subjected to 100 milliliters of 70° F. water for two hours.

24. The method of claim 19, further comprising allowing the polymeric resin to cure within said board to form a polyurethane/cellulose matrix, wherein the method produces a water resistant board.

\* \* \* \* \*